United States Patent
Liu et al.

(10) Patent No.: US 10,661,402 B2
(45) Date of Patent: May 26, 2020

(54) FIXTURE FOR SUPPRESSING TOOL VIBRATION ON OUTER RIM

(71) Applicant: CITIC DICASTAL CO., LTD

(72) Inventors: Weidong Liu, Hebei (CN); Xiaoyu Jiang, Hebei (CN); Xuesong Wang, Hebei (CN); Shengchao Zhang, Hebei (CN); Haiping Chang, Hebei (CN); Yingfeng Wang, Hebei (CN); Dan Yao, Hebei (CN)

(73) Assignee: CITIC Dicastal Co., Ltd., Qinhuangdao (NC)

( * ) Notice: Subject to any disclaimer, the term of this patent is extended or adjusted under 35 U.S.C. 154(b) by 237 days.

(21) Appl. No.: 16/024,266

(22) Filed: Jun. 29, 2018

(65) Prior Publication Data
US 2019/0224792 A1    Jul. 25, 2019

(30) Foreign Application Priority Data
Jan. 22, 2018  (CN) .......................... 2018100586887

(51) Int. Cl.
*B23Q 3/06* (2006.01)
*B21D 53/30* (2006.01)
*B23Q 11/00* (2006.01)

(52) U.S. Cl.
CPC ............ *B23Q 3/062* (2013.01); *B21D 53/30* (2013.01); *B23Q 11/0032* (2013.01)

(58) Field of Classification Search
CPC ....................................................... F16C 15/00
USPC ................................ 269/309–310, 900, 901
See application file for complete search history.

(56) References Cited

U.S. PATENT DOCUMENTS

| 6,205,110 B1 * | 3/2001 | Miyamoto | F16F 15/363 360/99.08 |
| 6,502,834 B1 * | 1/2003 | Fukui | B23B 31/201 279/156 |
| 7,159,952 B2 * | 1/2007 | Koschel | B24B 23/028 301/5.22 |

* cited by examiner

*Primary Examiner* — Joseph J Hail
*Assistant Examiner* — Anamika S. Mishty
(74) *Attorney, Agent, or Firm* — IPro, PLLC; Qian Gu

(57) ABSTRACT

A fixture for suppressing tool vibration on an outer rim, wherein a pressure claw base, an end face block and a base are installed on the chuck, and the pressure claw is installed on the chuck; a lower pressure plate is fixed on the base, limiting columns and an upper pressure plate are installed on the lower pressure plate, with steel balls and a rubber strip being enclosed in a space formed by the lower pressure plate and the upper pressure plate; and a rubber strip is enclosed in an annular groove formed by a jaw A and a jaw B, and can move radially in the groove. The fixture in the present invention is configured to counteract the vibration of the wheel rim during machining, and thus can effectively eliminate the problem of tool vibration on the outer rim.

2 Claims, 5 Drawing Sheets

FIXTURE FOR SUPPRESSING TOOL VIBRATION ON OUTER RIM

CROSS REFERENCE TO RELATED APPLICATION

This application claims priority to Chinese Patent Application No. 201810058688, entitled FIXTURE FOR SUPPRESSING TOOL VIBRATION ON OUTER RIM and filed on Jan. 22, 2018, which is incorporated herein by reference in its entirety and for all purposes.

FIELD OF THE INVENTION

The present invention relates to a machining device, specifically to a fixture for machining wheel.

BACKGROUND OF THE INVENTION

In the machining process of a wheel outer rim, the problem of tool vibration is likely to occur due to the vibration of a machine tool and the instable fixation of the wheel on the machine tool.

SUMMARY OF THE INVENTION

The aim of the present invention is to provide a fixture for suppressing tool vibration on an outer rim.

In order to fulfill the above aim, the technical solution of the present invention includes a fixture for suppressing tool vibration on an outer rim according to the present invention, comprising a chuck, a pressure claw base, a pressure claw shaft, an end face block, a pressure claw, a lower pressure plate, a rubber strip, steel balls, an upper pressure plate, a base, a positioning mandrel and limiting columns. The pressure claw base, the end face block and the base are installed on the chuck, the positioning mandrel is installed on the base, and the pressure claw is installed on the chuck by means of the pressure claw shaft and the pressure claw base. The lower pressure plate is fixed on the base, and the limiting columns and the upper pressure plate are installed on the lower pressure plate, with the steel balls and the rubber strip being enclosed in a space formed by the lower pressure plate and the upper pressure plate.

Two protrusion structures are formed on the upper end face of the lower pressure plate, and corresponding protrusion structures are formed on the lower end face of the upper pressure plate, with the outer protrusion structure on the lower pressure plate and the outer protrusion structure on the upper pressure plate forming a jaw A, and the inner protrusion structure on the lower pressure plate and the inner protrusion structure on the upper pressure plate forming a jaw B. The rubber strip is enclosed in an annular groove formed by the jaw A and the jaw B, and can move radially in the groove.

Three groups of steel balls are enclosed inside the jaw B and are separated by three limiting columns therebetween to avoid moving circumferentially during operation.

In operation, as the wheel rotates at a high speed, the steel balls are thrown outwardly by centrifugal force, and thus drive the rubber strip to move outwardly to compress the inner rim of the wheel. The rubber strip in the compressed state is of high elasticity and can effectively eliminate the vibration of the wheel rim during machining, which can effectively eliminate the problem of tool vibration on the outer rim.

A bevel structure is arranged on the upper end face of the outer portion of the lower pressure plate. After the operation is completed, the steel balls roll inwardly under the action of self-weight and thus disengage from the rubber strip to facilitate removal of the wheel.

In actual use, during the process of placing the wheel on the fixture, the positioning mandrel is positioned into the center hole of the wheel with tiny gaps being reserved between the rubber strip and the inner rim of the wheel, then the pressure claw compresses the wheel lip, and the wheel positioning operation is completed. Then, the machining of the wheel begins, and the wheel rotates at a high speed, with a result that the steel balls are thrown outwardly by the centrifugal force and thus drive the rubber strip to move outwardly to compress the inner rim of the wheel. The rubber strip in the compressed state is of high elasticity and can effectively eliminate the vibration of the wheel rim during machining, which can effectively eliminate the problem of tool vibration on the outer rim.

The fixture in present invention can suppress tool vibration on the outer rim, and at the same time, has the characteristics of simple structure, convenient manufacture, stable performance and precision that can meet the machining requirement.

Figure 1:
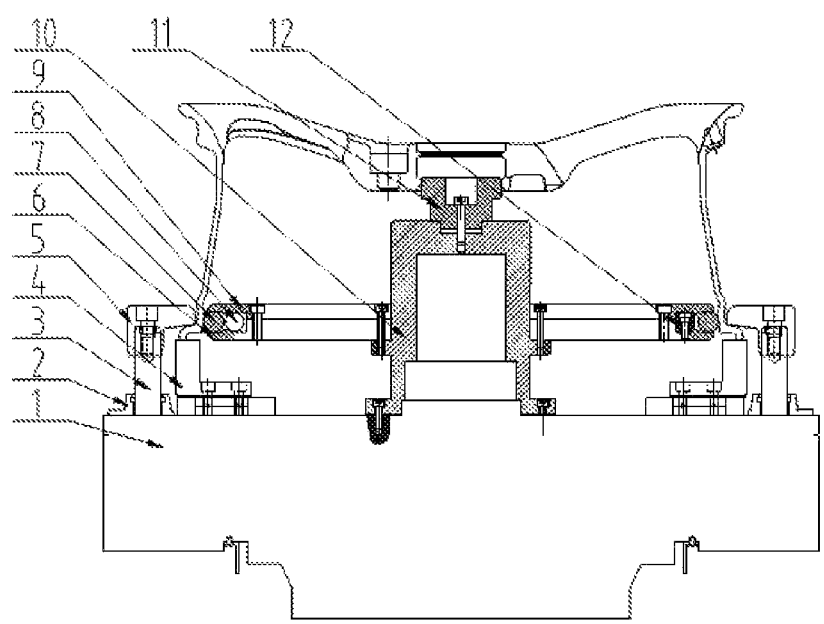
FIG. 1 is a side elevational view of a fixture for suppressing tool vibration on an outer rim according to the present invention.

In the drawings, 1-chuck, 2-pressure claw base, 3-pressure claw shaft, 4-end face block, 5-pressure claw, 6-lower pressure plate, 7-rubber strip, 8-steel ball, 9-upper pressure plate, 10-base, 11-positioning mandrel, 12-limiting column.

DETAILED DESCRIPTION OF THE PREFERRED EMBODIMENTS

The details and working conditions of the specific device according to the present invention will be described in detail below in combination with the drawings.

Figures 2A, 2B:
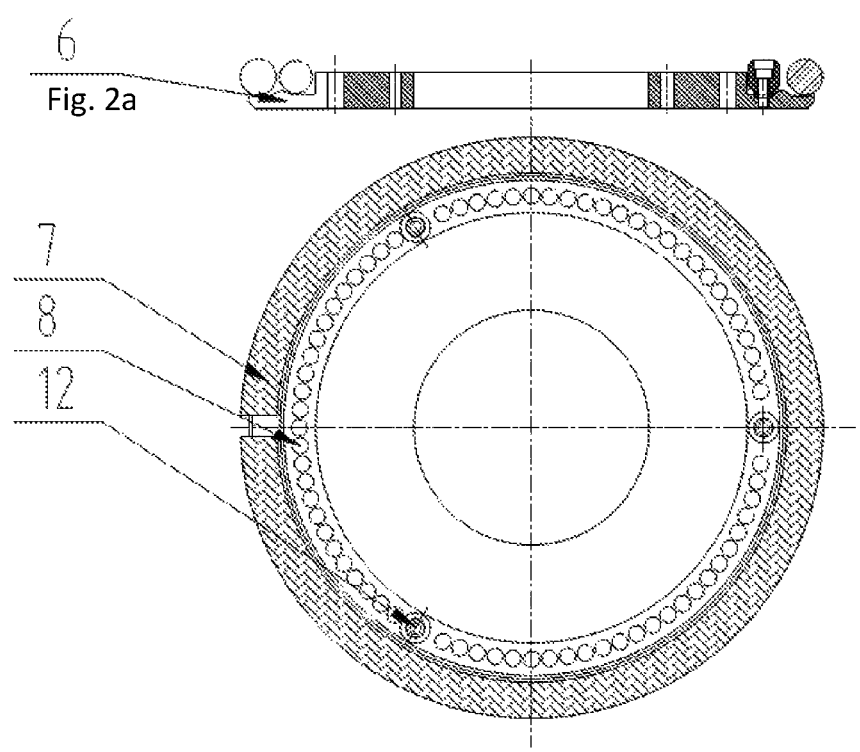
FIG. 2a is a side elevational view and FIG. 2b is a top plan view showing the distribution of a rubber strip, steel balls and limiting columns in the fixture for suppressing tool vibration on the outer rim according to the present invention.
Figure 3:
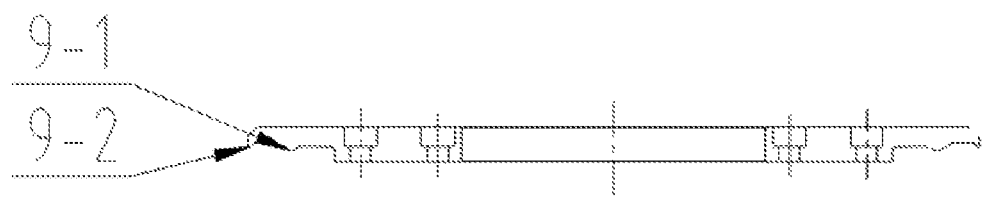
FIG. 3 is a side elevational view of an upper pressure plate in the fixture for suppressing tool vibration on the outer rim according to the present invention.
Figure 4:
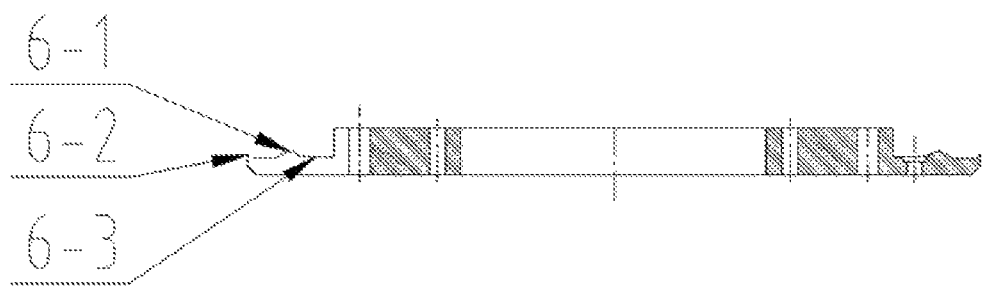
FIG. 4 is a side elevational view of a lower pressure plate in the fixture for suppressing tool vibration on the outer rim according to the present invention.
Figure 5:
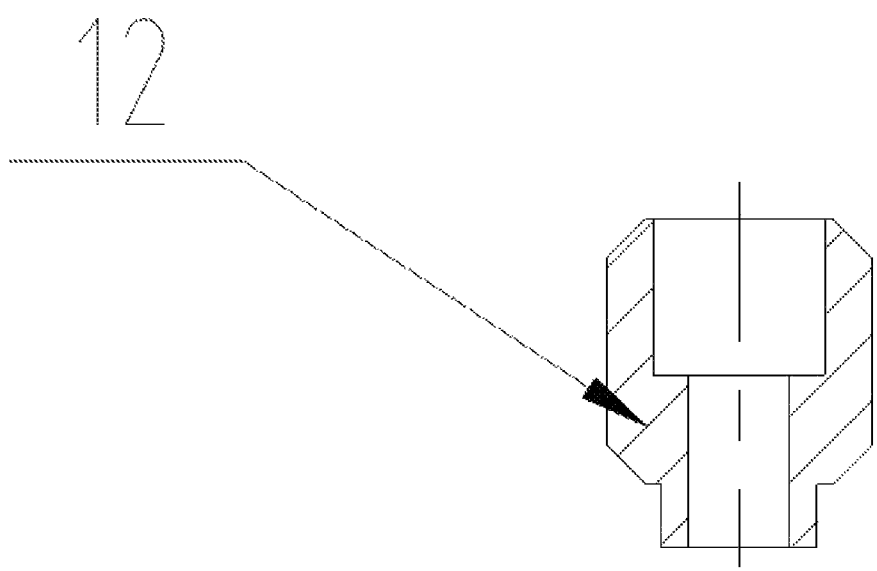
FIG. 5 is a side elevational view of a limiting column in the fixture for suppressing tool vibration on the outer rim according to the present invention.

As shown in FIGS. 1-5, a fixture for suppressing tool vibration on an outer rim according to the present invention comprises a chuck 1, a pressure claw base 2, a pressure claw shaft 3, an end face block 4, a pressure claw 5, a lower pressure plate 6, a rubber strip 7, steel balls 8, an upper pressure plate 9, a base 10, a positioning mandrel 11 and limiting columns 12. The pressure claw base 2, the end face block 4 and the base 10 are installed on the chuck 1, the positioning mandrel 11 is installed on the base 10, and the pressure claw 5 is installed on the chuck 1 by means of the pressure claw shaft 3 and the pressure claw base 2. The lower pressure plate 6 is fixed on the base 10, and the limiting columns 12 and the upper pressure plate 9 are installed on the lower pressure plate 6, with the steel balls 8 and the rubber strip 7 being enclosed in a space formed by the lower pressure plate 6 and the upper pressure plate 9.

Two protrusion structures 6-1 and 6-2 are formed on the upper end face of the lower pressure plate 6, and corresponding protrusion structures 9-1 and 9-2 are formed on the lower end face of the upper pressure plate 9, with the outer protrusion structure 6-2 on the lower pressure plate 6 and the outer protrusion structure 9-2 on the upper pressure plate 9 forming a jaw A, and the inner protrusion structure 6-1 on the lower pressure plate 6 and the inner protrusion structure 9-1 on the upper pressure plate 9 forming a jaw B. The rubber strip 7 is enclosed in an annular groove formed by the jaw A and the jaw B, and can move radially in the groove.

Three groups of steel balls 8 are enclosed inside the jaw B and are separated by three limiting columns 12 therebetween to avoid moving circumferentially during operation.

In operation, as the wheel rotates at a high speed, the steel balls 8 are thrown outwardly by centrifugal force, and thus drive the rubber strip 7 to move outwardly to compress the inner rim of the wheel. The rubber strip 7 in the compressed state is of high elasticity and can effectively eliminate the vibration of the wheel rim during machining, which can effectively eliminate the problem of tool vibration on the outer rim.

A bevel structure 6-3 is arranged on the upper end face of the outer portion of the lower pressure plate 6. After the operation is completed, the steel balls 8 roll inwardly under the action of self-weight and thus disengage from the rubber strip 7 to facilitate removal of the wheel.

In actual use, during the process of placing the wheel onto the fixture, the positioning mandrel 11 is positioned into the center hole of the wheel with tiny gaps being reserved between the rubber strip 7 and the inner rim of the wheel, then the pressure claw compresses the wheel lip, and the wheel positioning operation is completed. Then, the machining of the wheel begins, and the wheel rotates at a high speed, with a result that the steel balls 8 are thrown outwardly by the centrifugal force and thus drive the rubber strip 7 to move outwardly to compress the inner rim of the wheel. The rubber strip 7 in the compressed state is of high elasticity and can effectively eliminate the vibration of the wheel rim during machining, which can effectively eliminate the problem of tool vibration on the outer rim.

The invention claimed is:

1. A fixture for suppressing tool vibration on an outer rim, comprising a chuck, a pressure claw base, a pressure claw shaft, an end face block, a pressure claw, a lower pressure plate, a rubber strip, steel balls, an upper pressure plate, a base, a positioning mandrel and limiting columns, wherein
    the pressure claw base, the end face block and the base are installed on the chuck, the positioning mandrel is installed on the base, and the pressure claw is installed on the chuck via the pressure claw shaft and the pressure claw base, the lower pressure plate is fixed on the base, and the limiting columns and the upper pressure plate are installed on the lower pressure plate, with the steel balls and the rubber strip being enclosed in a space formed by the lower pressure plate and the upper pressure plate,
    two protrusion structures are formed on an upper end face of the lower pressure plate, and two corresponding protrusion structures are formed on a lower end face of the upper pressure plate, with the outer protrusion structure on the lower pressure plate and the outer protrusion structure on the upper pressure plate forming an outer jaw, and the inner protrusion structure on the lower pressure plate and the inner protrusion structure on the upper pressure plate forming an inner jaw, the rubber strip is enclosed in an annular groove formed by the outer jaw and the inner jaw, and are configured to move radially in the groove, and
    three groups of the steel balls are enclosed inside the inner jaw and are separated by three limiting columns therebetween to avoid moving circumferentially during operation.

2. The fixture for suppressing tool vibration on the outer rim according to claim 1, wherein a bevel structure is arranged on the upper end face of an outer portion of the lower pressure plate, after the operation is completed, the steel balls roll inwardly under the action of self-weight and thus disengage from the rubber strip to facilitate removal of the wheel.

\* \* \* \* \*